United States Patent

Czarnecki et al.

[11] Patent Number: 5,828,506
[45] Date of Patent: Oct. 27, 1998

[54] MAGNETIC HEAD INTERFACE HAVING A SINGLE NARROW BAND OF CONTACT FOR LONGITUDINAL EDGE TRACK RECORD/REPRODUCE ON MAGNETICS-ON-FILM (MOF)

[75] Inventors: Wlodzimierz Stanley Czarnecki, Rancho Santa Fe; Kent Raphael Gandola, Carlsbad, both of Calif.; Richard R. Tuyn, Fairport, N.Y.; George William Brock, La Jolla, Calif.

[73] Assignee: Eastman Kodak Company, Rochester, N.Y.

[21] Appl. No.: 694,070

[22] Filed: Aug. 8, 1996

[51] Int. Cl.⁶ ................................. G11B 15/62
[52] U.S. Cl. .................. 360/3; 360/1; 360/130.3
[58] Field of Search .................... 360/122, 128, 360/103, 104, 129, 121, 1, 3, 130.3, 130.31, 130.32

[56] References Cited

U.S. PATENT DOCUMENTS

| | | | |
|---|---|---|---|
| 5,146,671 | 9/1992 | Ogawa et al. | 360/121 X |
| 5,151,837 | 9/1992 | Wakasugi et al. | 360/103 |
| 5,519,464 | 5/1996 | Brock et al. | 360/1 X |
| 5,537,732 | 7/1996 | Fukuda et al. | 360/103 X |
| 5,678,086 | 10/1997 | Gandola et al. | 360/122 |

Primary Examiner—Aristotelis M. Psitos
Assistant Examiner—K. Wong
Attorney, Agent, or Firm—William F. Noval

[57] ABSTRACT

Photographic apparatus for recording/reproducing information in a magnetic region along an edge of photographic film, the apparatus comprising:

a magnetic head supported by said apparatus in contact with a magnetic region of film transported past the magnetic head, the magnetic head having a frustum shape in the direction of film transport with at least one magnetic gap at the center of the frustum, wherein the magnetic head-to-film interface is concentrated in those regions immediately surrounding the gap regions.

7 Claims, 8 Drawing Sheets

FIG. 6
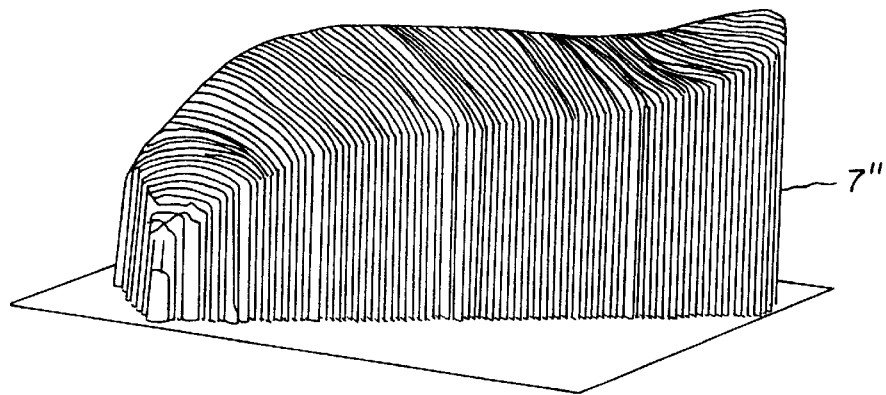
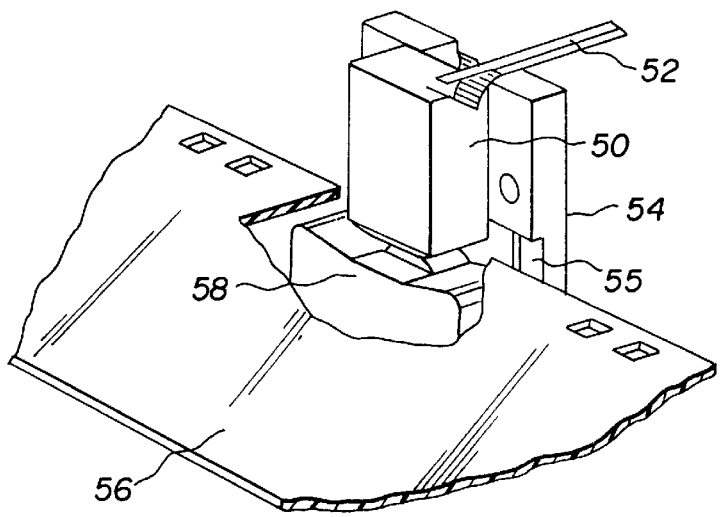
FIG. 7a
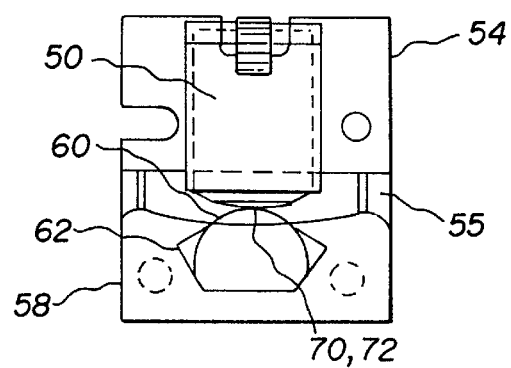
FIG. 7b

MAGNETIC HEAD INTERFACE HAVING A SINGLE NARROW BAND OF CONTACT FOR LONGITUDINAL EDGE TRACK RECORD/ REPRODUCE ON MAGNETICS-ON-FILM (MOF)

FIELD OF INVENTION

This invention relates in general to magnetic recording/reproducing systems and more particularly to the reading and writing of information on a virtually transparent magnetic layer on photographic film.

BACKGROUND OF THE INVENTION

U.S. Pat. Nos. 4,933,780 and 4,977,419 disclose a photographic film having a Magnetics-On-Film (MOF) layer and dedicated tracks for recording information, such as film type, film speed, film exposure information, and information relevant to processing and subsequent printing. Magnetic reading and writing of information on an MOF layer as disclosed in these patents is restricted to dedicated parallel tracks extending longitudinally along the edges of the film strip.

Reading and recording information on photographic film in a camera or a photofinisher requires solutions to problems that are different than those encountered in a typical magnetic tape drive. In a tape drive, the magnetic tape is flexible enough under tension to conform to the head contour. Photographic film by contrast, is much thicker, thus it has a tendency to curl and it does not comply to the head contour.

The inherent tendency of photographic film to curl is caused primarily by the difference in humidity expansion between the photographic emulsion and the base support substrate. Additionally, a film strip previously stored in roll form, exhibits a widthwise cross curvature when placed on a horizontal surface and rolled out. The widthwise cross curvature is a result of lengthwise plastic flow (core-set curl). The edges of the film strip, where the recording takes place, are further influenced by the bending phenomena known as anticlastic curvature. Because of the nonplanar geometry of the photographic film, it is difficult to achieve good contact and compliance across the gap of a recording head.

The prior art related to recording on photographic film teaches that providing a pressure pad support for the recording medium, ensures reliable recording. In U.S. Pat. No. 4,933,780, the magnetic head bears against the MOF layer of a filmstrip that is exposed through an opening in the film cartridge lip, while the film emulsion side is supported by a light blocking plush material lining the lower flange of the cartridge lip. In U.S. Pat. No. 5,285,324, the emulsion side support is disclosed as a flexible plate having several sections aligned with the individual tracks of the magnetic head and providing independent spring forces to compensate for the varying amounts of curl along the width of the film strip. In U.S. Pat. No. 5,274,522, a backer device (bubble spring) is used to provide the means of support for the emulsion side of the photographic film. As disclosed, the load required to control the head/film interface is on the order of 80 grams for speeds of up to 16 ips. The magnetic head has a continuous radius head bearing surface positioned opposite the bubble spring, which is effective in generating an acceptable head-to-film interface for nominal room temperature conditions. Due to change in environmental conditions and due to head clogging (debris build-up) however, the compliance of the head-to-film interface is degraded, resulting in a loss of reproduce signal.

SUMMARY OF THE INVENTION

The invention is directed to solving the above stated problems. According to a feature of the present invention there is provided photographic apparatus for recording/reproducing information in a magnetic region along an edge of photographic film, the apparatus comprising:

a magnetic head supported by said apparatus in contact with a magnetic region of film transported past the magnetic head, the magnetic head having a frustum shape in the direction of film transport with at least one magnetic gap at the center of the frustum, wherein the magnetic head-to-film interface is concentrated in those regions immediately surrounding the gap regions.

ADVANTAGEOUS EFFECT OF THE INVENTION

Advantageous effects of the invention are the reliably recording and reproducing of information on MOF layers along the parallel tracks extending longitudinally along the edges of the filmstrip. Reliability is achieved by enhancing the compliance of the magnetic head-to-film interface, minimizing damage to the film strip, equalizing the head pressure distribution, and preserving a minimum wear life of the magnetic head under all environmental and operating conditions.

BRIEF DESCRIPTION OF THE DRAWINGS

FIGS. 5a, 5b, 6 are perspective views of other embodiments of magnetic heads according to the present invention.

FIGS. 7a, 7b, 8, and 14 are views useful in illustrating the present invention.

DETAILED DESCRIPTION OF THE INVENTION

Figure 15:
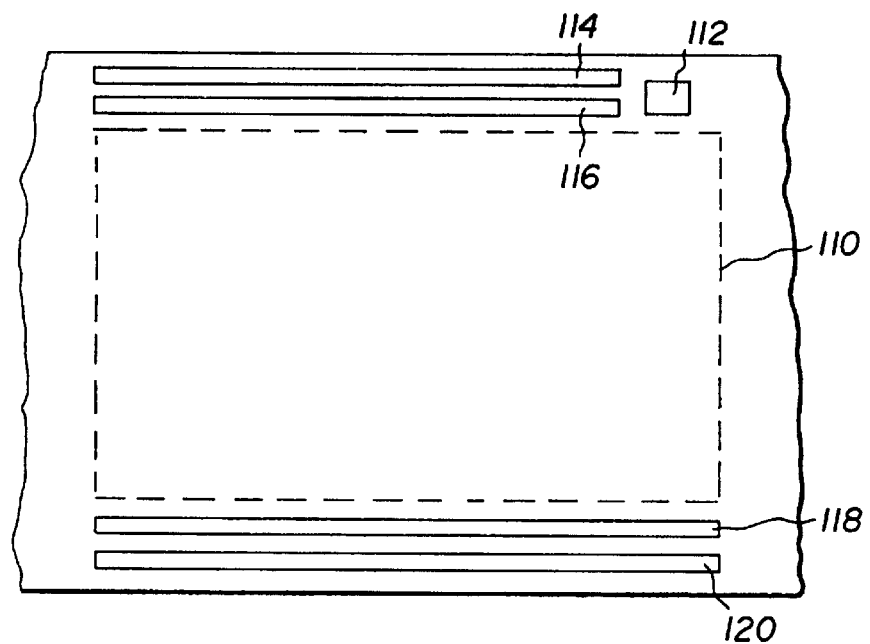
FIGS. 15 and 16 are views of film which may be used with the present invention.
Figure 16:
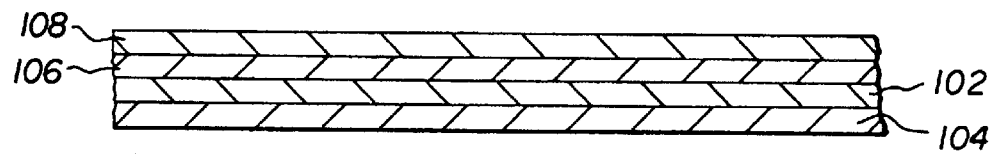

In general the present invention is incorporated in photographic apparatus using photographic film having a virtually transparent layer. Such film is shown in FIGS. 15 and 16. As shown in FIG. 16, film 100 includes a base 102, various well-known emulsion layers 104 on one side of base 102 and a virtually transparent magnetic layer 106 on the other side of base 102. An anti-static and lubricating layer 108 overlies magnetic layer 106. As shown in FIG. 15, film 100 is divided into a series of frames. Each frame has an image area 110, at least one perforation 112 along one edge of film 100 to identify the frame, and magnetic tracks 114, 116 along the film edge having perforation 112 and magnetic tracks 118, 120 along the opposite edge of film 100. Magnetic tracks 114–120 are located outside of image area 110.

Magnetic tracks 118 and 120 are referred to as the information exchange (IX) or camera tracks and tracks 114 and 116 are referred to as the photofinisher tracks.

Figure 1:
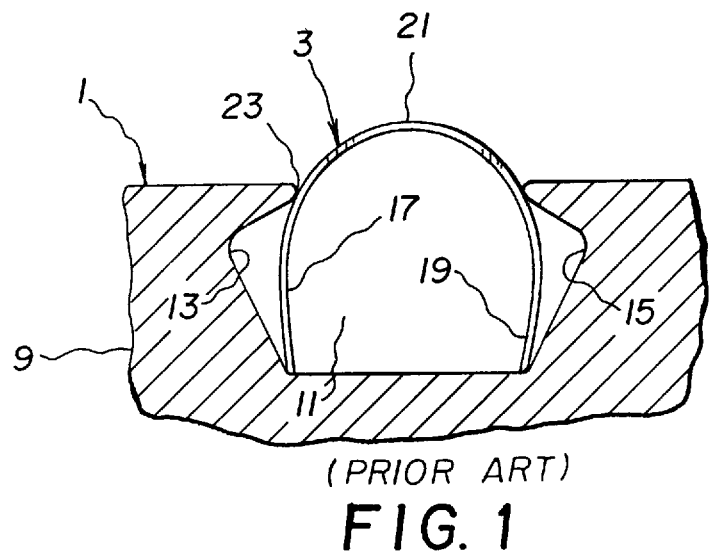
FIG. 1 is a sectional view of a bubble spring backing device.
Figure 2:
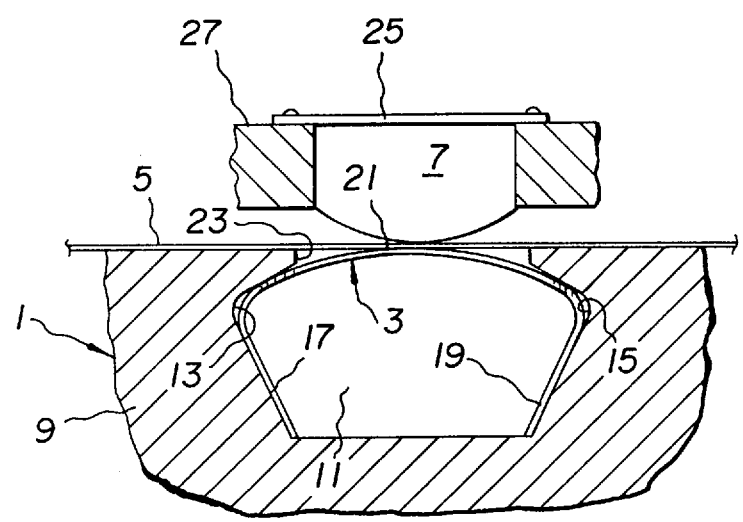
FIG. 2 is a sectional view of the device of FIG. 1 compressed by a magnetic head.

The present invention is realized in a record/reproduce apparatus, such as a camera or a photofinisher workstation that receives a photographic film strip having a magnetic layer. As shown in FIGS. 1 and 2, apparatus 1 includes a member 9 having opening 11 with angled side walls 13, 15. A bubble spring 3 is located in opening 11. Bubble spring 3 has a curved film engaging portion 21 and legs 17, 19. In FIG. 1, spring 3 engages lip 23 of wall 13 and is not engaged. As shown in FIG. 2, a magnetic head 7 is positioned in apparatus 1 along the longitudinal edge(s) of the film 5. The bubble spring 3 is positioned opposite the magnetic head gap of magnetic head 7 on member 27 with backing member 25. The magnetic head 7 is penetrated into the plane of film 5 and compresses the bubble spring 3 so as to develop a wrap angle around the magnetic head gaps, and to uniformly distribute the load force across the head bearing surface.

Figure 3:
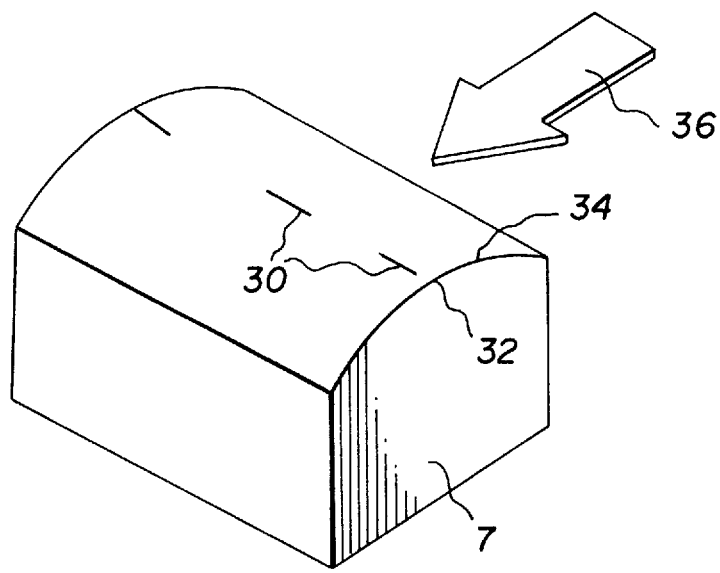
FIG. 3 is a perspective view of a magnetic head.
Figure 4:
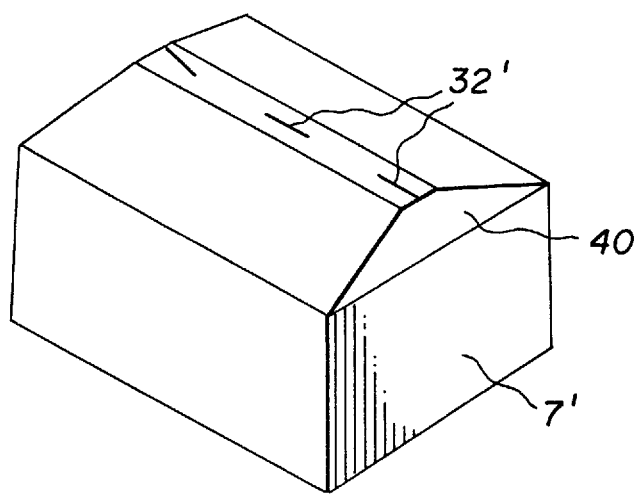
FIG. 4 is a perspective view of one embodiment of magnetic head according to the present invention.
Figure 5A:
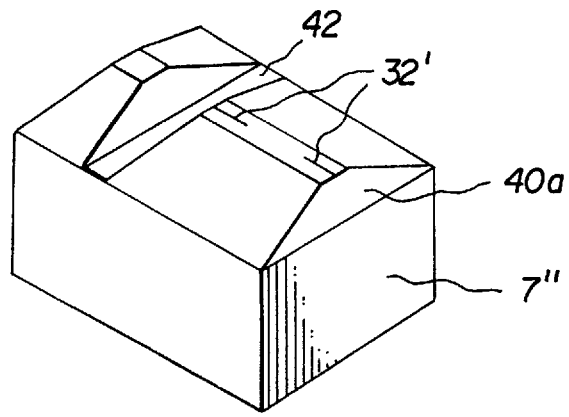
Figure 5B:
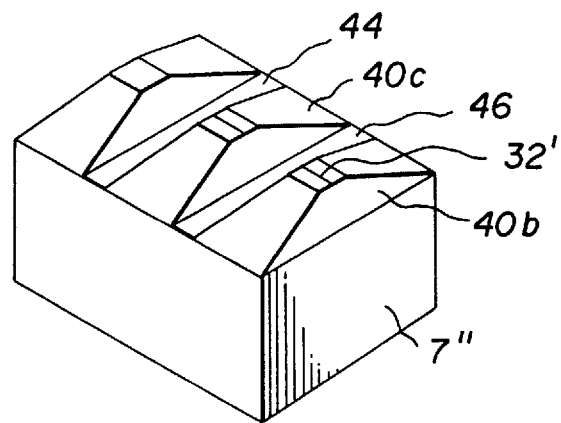

As shown in FIG. 3, the magnetic head gaps 30 of head 7 are positioned at the apex 32 of the cylindrical profile 34 of head 7 with the major axis oriented perpendicular to the film motion direction 36. According to a preferred embodiment of the present invention, magnetic head 7' is modified in the regions of the head bearing surface in the shape of an elongated frustum 40 (FIG. 4). The frustum shape serves to concentrate the contact of the head-to-film interface to those regions immediately surrounding the gap 32' regions. Other embodiments of the invention which have been found to work well include the segmented frustum designs shown in FIGS. 5a, 5b. The relieved areas 42 (FIG. 5a), 44, 46 (FIG. 5b) in these embodiments serve to further concentrate the contact pressure at the head gap 32'.

In accordance with this invention, near contact compliance is achieved over a well-defined and isolated area around the magnetic head gaps, and is maintained over the broad range of environmental and operating conditions.

According to another embodiment of the present invention, the magnetic head 7 bearing surface is further optimized by introducing an asymmetrical contoured profile (FIG. 6) to ensure a high degree of head-to-film compliance. The asymmetrical contoured profile of the head bearing surface is a by-product of an in situ lapping process. The in situ process is achieved using a compliant lapping tape, having a thin support substrate, interposed between the magnetic head 7 and the bubble spring 3. Those regions of the head bearing surface that exhibit a high contact pressure are abraded down by advancing the interposed lapping tape until the pressure distribution across the head bearing surface reaches equilibrium. The resulting asymmetrical contoured profile produced, more nearly represents the shape that the head would naturally take given wear over time.

A photofinisher workstation is required to transport spliced and curled film over a broad range of transport velocities, film tensions, and environmental conditions. Because of these requirements, the dimensions of the film path are loosely toleranced such that the film is free to move laterally and vertically. In addition, the transported film may be either in a raw (preprocessed) or processed state. Unlike traditional 35 mm film, a magnetically coated film is arranged with some film perforations on one side of the filmstrip, and no perforations on the other. The magnetic recording tracks are located along both filmstrip edges.

Figure 14:
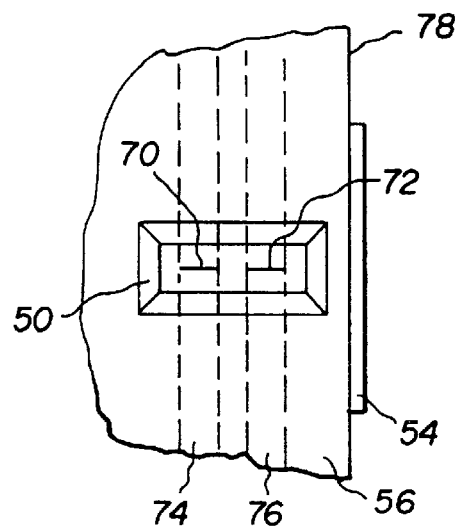

As shown in FIGS. 7a, 7b, and 14, a magnetic recording head 50 having signal cable 52 is fixedly attached to an edge guide 54 having ceramic edge guide inserts 55 disposed to provide a lateral position and angular orientation of the head 50 with respect to the edge of the film 56. As shown in FIG. 14, head 50 includes head gaps 70, 72 contacting respective magnetic tracks 74, 76 of film 56. Film edge 78 is shown contacting edge guide 54. A bubble spring assembly 58 is located opposite head 50 and includes bubble spring 60 in bubble spring cavity 62. In addition, the edge follower assembly is disposed to provide a fixed penetration of the head with respect to the plane of the film. The penetration of the magnetic head 50 into the plane of film 56 develops a wrap angle in the range from 5 to 9 degrees. In a photofinisher apparatus, a magnetic head is similarly configured in an edge follower assembly on both sides of filmstrip edges.

The lateral position of the IX and photofinisher magnetic heads is confined to the two 2.78 mm wide regions located along each of the filmstrip edges. The nominal 18.44 mm wide central portion of the filmstrip is allowed to vary as a function of film slit width tolerances and the guidance provided by the two edge following assemblies. The combination of the head wrap angle and the head contact force at only the film edges, results in the film wrapping around the inside edge of the head bearing surface away from the intended gap regions.

According to a preferred embodiment of the invention, the magnetic head structure is defined by an elongated frustum, whose film bearing surface ranges in length from 0.25 to 1.25 mm in the film motion direction, and from 2.0 to 3.0 mm in the trackwidth direction. The length of the frustum (defined by the film motion direction) is smaller than the length of the chord established by the longitudinal wrap angle such that the leading and trailing edges of the head bearing surface are under high contact pressure.

Figure 8:
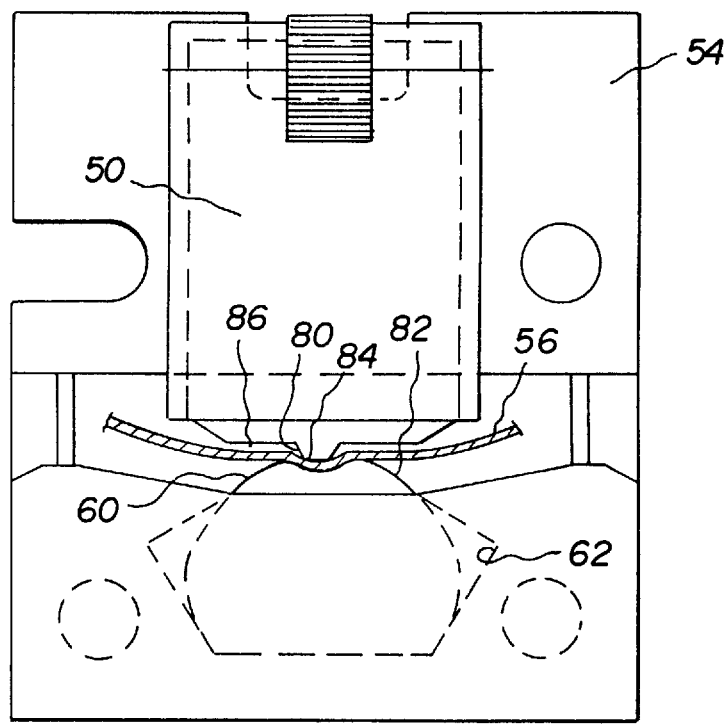

The lateral faces 80, 82 of the frustum are inclined down from the edges of the bearing surface 84 to the base 86 of the frustum in order to clear everything but the bearing surface from making contact with the filmstrip (FIG. 8). These lateral faces 80, 82 are sloped at an angle ranging from 10 to 30 degrees. The magnetic gaps 70, 72 are located at the apex of the bidirectionally contoured bearing surface. The bearing surface is asymmetrically extended inward beyond the inner track of the magnetic head (FIG. 14) in order to provide improved control over the film wrap angle in the trackwidth direction.

Figure 9:
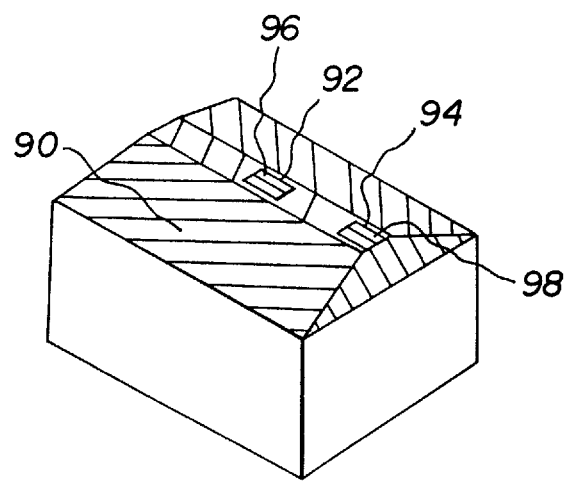
FIGS. 9 and 10 are perspective views of further embodiments of magnetic heads according to the present invention.

To improve the wear life of the magnetic recording head, according to another embodiment of the invention, there is provided a ceramic cap 90 of frustum conical shape at the head bearing surface (FIG. 9). The ceramic cap 90 has two window openings 92, 94 through which the "made-to-fit" machined magnetic pole pieces 96, 98 are inserted. Ideally, the ceramic cap 90 has a cylindrical apex and has been previously formed or cut to the relieved frustum shape. The ceramic cap 90 and the inserted head pole pieces 96, 98 are subsequently finish-contoured until they are coplanar and form a continuous cylinder which extends to the edges of the frustum.

Figure 10:
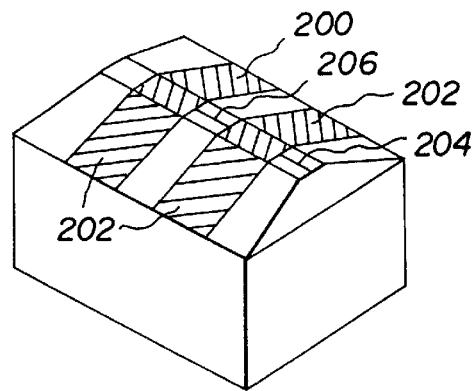

Alternate embodiments which increase head wear life, include the use of ceramic rail inserts 200, 202 between heads 204, 206 (FIG. 10) instead of the continuous ceramic cap. A plurality of rails and/or rail materials, and combinations of rail widths can be used depending on head wear requirements.

The invention employs a media backer device (bubble spring) as described in U.S. Pat. No. 5,274,522, into which the head bearing surface is penetrated. This provides the means of applying a single line of contact on the emulsion side of the MOF coated film, and urges the film to comply with the gaps of the magnetic head.

Figure 12:
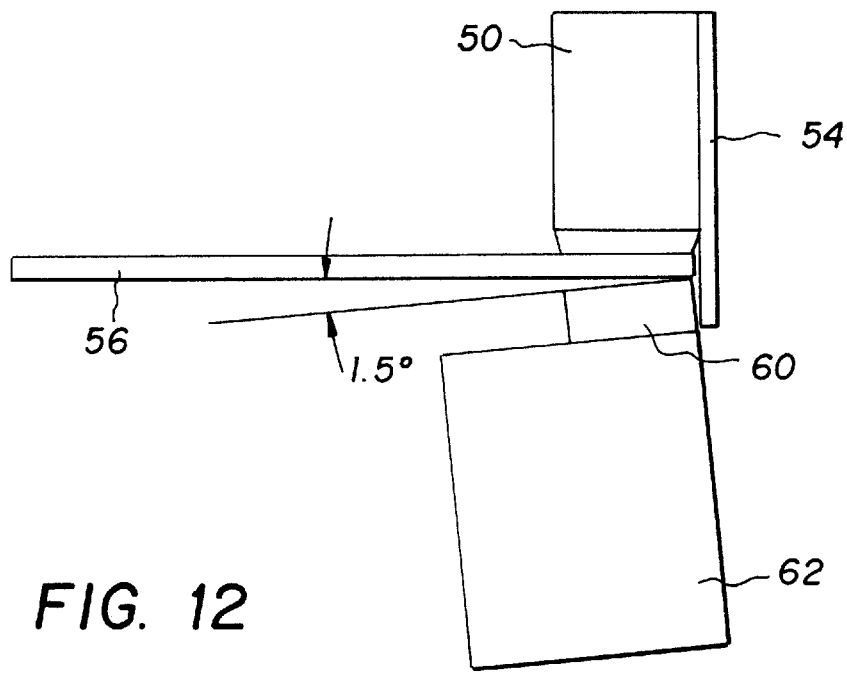
FIGS. 12 and 13 are elevational views of backing device orientations according to an aspect of the present invention.

As shown in FIG. 12, an advantageous novelty of the invention is a preferential "negative" roll angle (1 to 3 degrees) provided to the bubble spring 60 which tends to apply a greater amount of form at the outside edge of the curled film 56, and also therefore to the head bearing surface, thereby equalizing the force allocation along the entire width of said surface.

Figure 13:
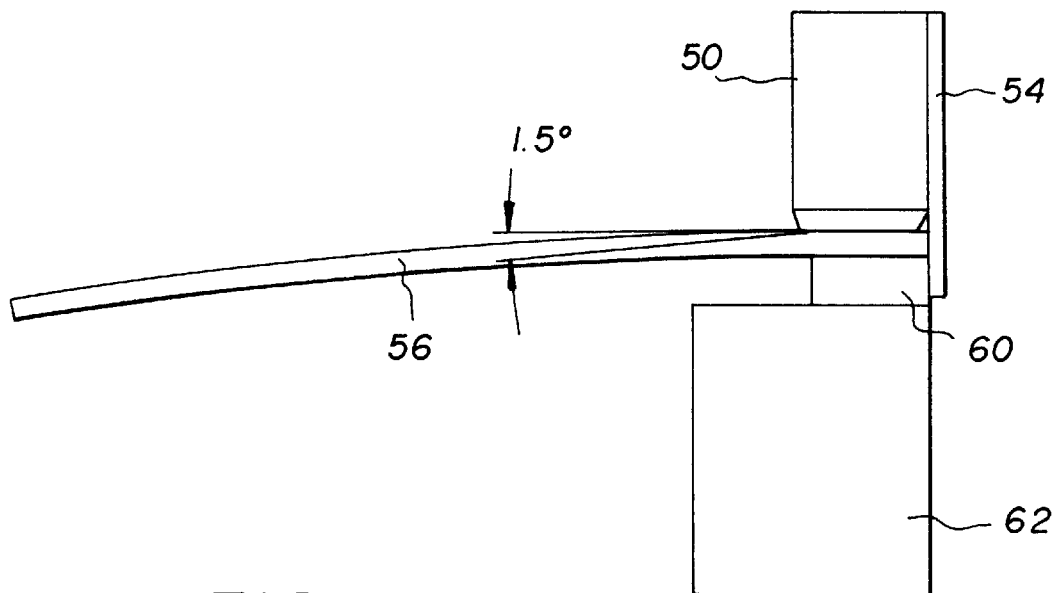

As shown in FIG. 13, a similar effect can be achieved by maintaining a zero roll relationship between the head 50 and the bubble spring 60, but then applying a "positive" roll angle (1 to 3 degrees) to entire head and bubble spring assembly.

Figure 11:
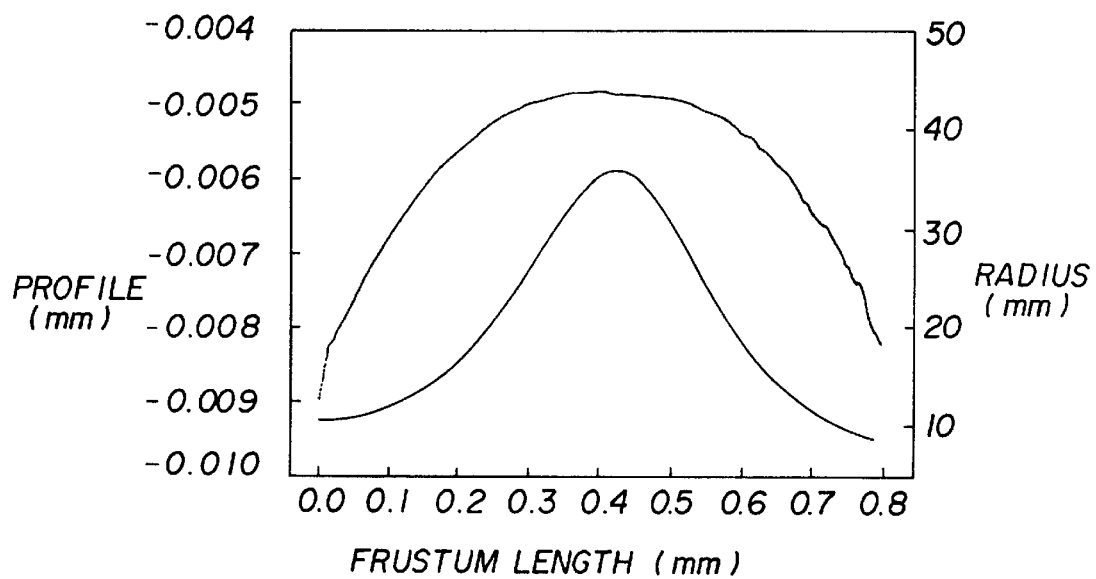
FIG. 11 is a graphical view useful in illustrating the embodiment of FIG. 6.

As shown in FIG. 6, the compliance across the width of the head bearing surface is improved even further by in situ contouring of the head. A strip of lapping material, such as a diamond lapping tape having, for example, a 25-micron thick PET base with a 1-micron diamond grit size, is interposed between the magnetic head and the bubble spring with the diamond grit facing the head bearing surface. The lapping tape is advanced together with the film strip through the film transport path. In this manner, the head bearing surface is lapped until all of the initial high pressure points of contact, such as the four edges and corners of the bearing surface, are abraded down and the contact pressure is uniformly distributed across the entire bearing surface. Through this process, the initial cylindrical surface of the frustum head is transformed into an aspheric bearing surface closely approximated by a prolate ellipsoid. As shown in FIG. 11, the discrete radius at the apex of the longitudinal (in-track) profile the head contour ranges from 25 to 100 mm, and gradually decreases at the edges of the contoured frustum to a value under 10 mm.

While the invention has been shown and described with reference to a preferred embodiment thereof, it will be apparent that various changes may be made without departing from the scope of the invention as defined by the appended claims.

What is claimed is:

1. Photographic apparatus for recording/reproducing information in a magnetic region along an edge of photographic film, said apparatus comprising:

a magnetic head supported by said apparatus in contact with a magnetic region of film transported past said magnetic head, said magnetic head having a frustum shape in the direction of said film transport with at least one magnetic gap at the center of said frustum, wherein said magnetic head-to-film interface is concentrated in those regions immediately surrounding the gap regions; including a resilient backer device supported by said apparatus opposite said magnetic head gap to apply a single line of contact along the apex of the head bearing surface effecting equalization of the force distribution, wherein said backer device is tilted toward said magnetic head at the edge of said film to achieve a more uniform head-to-film compliance and to better balance the head-to-film force distribution.

2. The apparatus of claim 1 wherein said magnetic head additionally has a frustum shape in a direction transverse to said direction of film transport.

3. The apparatus of claim 1 wherein said backer device is a resilient bubble spring which is compressed by said magnetic head so as to develop a wrap angle around the magnetic head gap to uniformly distribute the load force across the head bearing surface.

4. The apparatus of claim 1 wherein said magnetic head has at least two aligned head gaps and has a slot between the head gaps to further concentrate the contact pressure with said film at the head gaps.

5. The apparatus of claim 1 wherein said magnetic head includes a ceramic cap of frustum shape having an opening through which magnetic pole pieces defining said magnetic gap are inserted.

6. The apparatus of claim 5 wherein said magnetic head includes a ceramic insert in said slot having the frustum shape of said magnetic head.

7. Photographic apparatus for recording/reproducing information in a magnetic region along an edge of photographic film, said apparatus comprising:

a magnetic head supported by said apparatus in contact with a magnetic region of film transported past said magnetic head, said magnetic head having a frustum shape in the direction of said film transport with at least one magnetic gap at the center of said frustum, wherein said magnetic head-to-film interface is concentrated in those regions immediately surrounding the gap regions, including a resilient backer device supported by said apparatus opposite said magnetic head gap to apply a single line of contact along the apex of the head bearing surface effecting equalization of the force distribution, wherein said backer device and said head are both tilted downward at the edge of said film to achieve a more uniform head-to-film compliance and to better balance the head-to-film force distribution.

* * * * *